Feb. 23, 1926.

H. PERROT 1,574,106

VEHICLE WHEEL BRAKE SHOE

Filed April 15, 1924    2 Sheets-Sheet 1

INVENTOR
HENRI PERROT
BY
A. D. T. Libby
ATTORNEY

Feb. 23, 1926.
H. PERROT
VEHICLE WHEEL BRAKE SHOE
Filed April 15, 1924  2 Sheets-Sheet 2
1,574,106
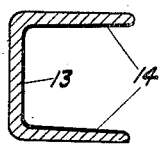
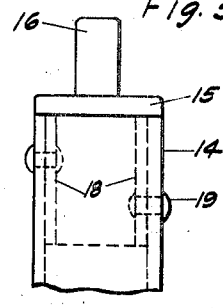
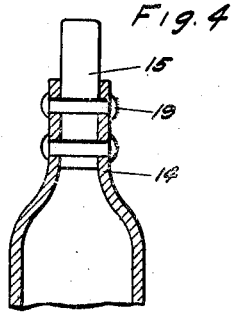
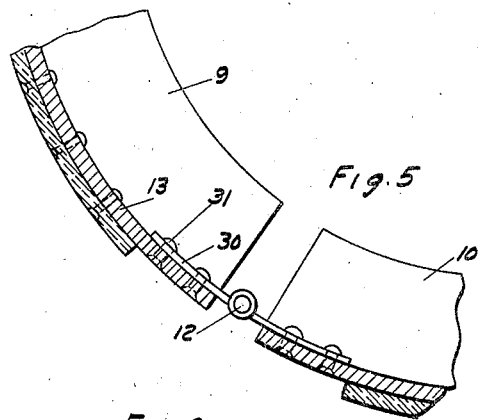
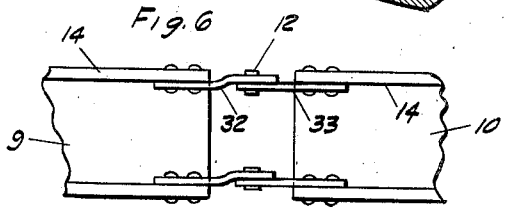
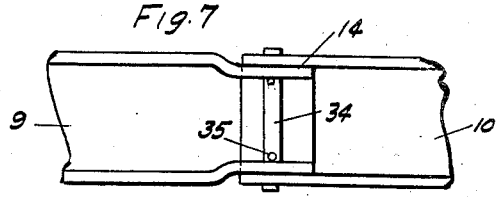
INVENTOR
HENRI PERROT
BY
A. D. T. Libby
ATTORNEY Patented Feb. 23, 1926.

1,574,106

UNITED STATES PATENT OFFICE.

HENRI PERROT, OF PARIS, FRANCE.

VEHICLE WHEEL BRAKE SHOE.

Application filed April 15, 1924. Serial No. 706,928.

*To all whom it may concern:*

Be it known that I, HENRI PERROT, a citizen of France, residing at Paris, France, have invented certain new and useful Improvements in Vehicle Wheel Brake Shoes, of which the following is a description, reference being had to the accompanying drawing, and to the figures of reference marked thereon.

This invention relates to the construction of brake shoes that are used more particularly in connection with the wheels of an automotive vehicle. In the past many of the brake shoes used internally within a brake drum have been made from castings, such as aluminum or cast iron. It is a well-known fact that wherever metal stampings can be used, that these parts can be made lighter and stronger and at the same time cheaper than castings.

It is, therefore, the principal object of my invention to provide a lighter stronger and cheaper construction of brake shoes.

In order to illustrate the application of my invention I have applied it to a type of brake known in the automotive trade as the Perrot-Farman type, in which the brake shoe consists of primary and secondary members which are pivoted together independent of the support, but it is to be understood that the construction is applicable to other types of brakes than the particular form herein shown.

My invention will be clearly understood by reference to the attached drawings, in which:

Figure 2 is a section on the line 2—2 of Fig. 1; and

Figure 3 is a detail plan view of one end of the brake that is engaged by the actuating cam.

Figure 4 is a modification of Fig. 3.

Figures 5, 6 and 7 show modified forms of the joint mechanism containing the primary and secondary members of the brake shoes.

Figure 1:
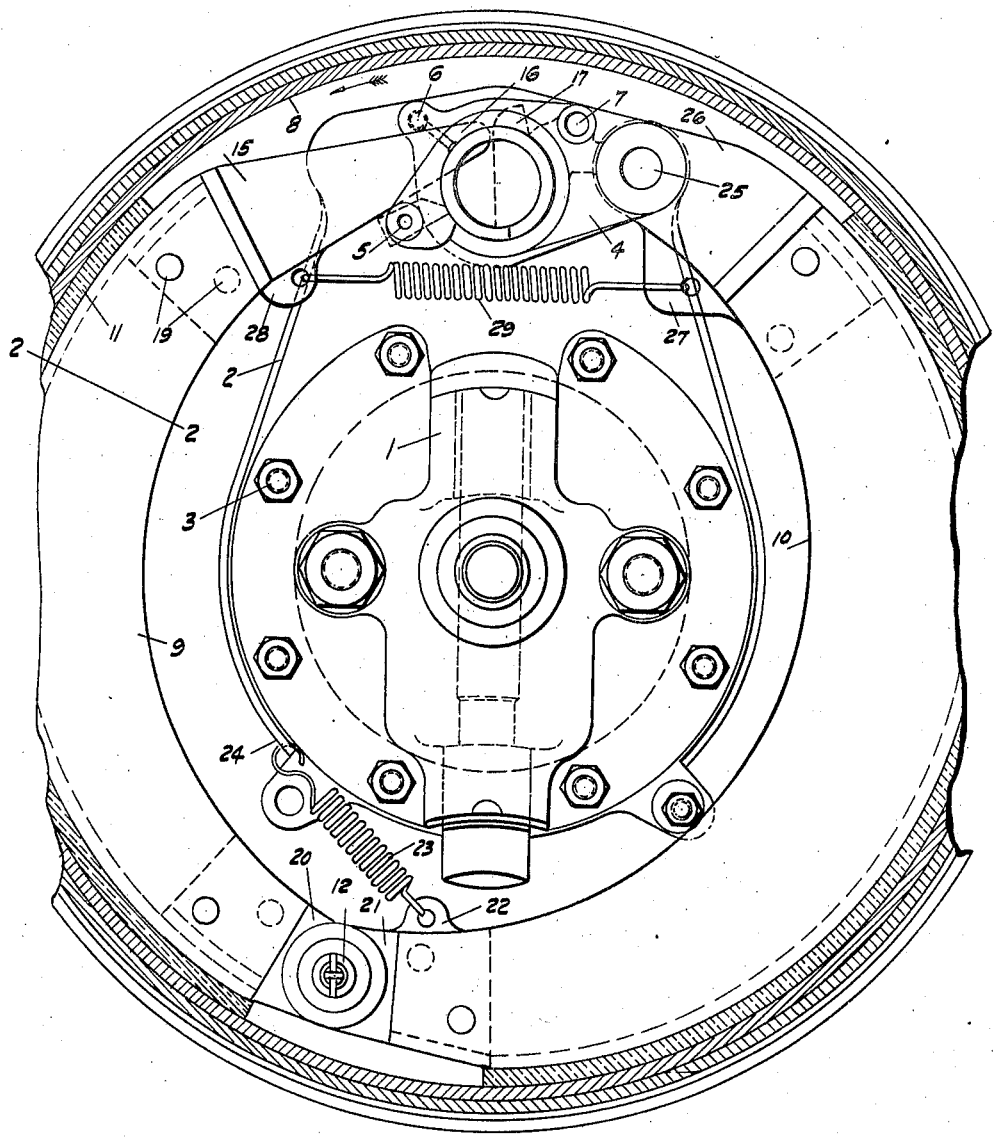
Figure 1 is a side elevation of the brake mechanism of a wheel, looking from the wheel side, the wheel being cut away.

Referring now to the details wherein like numbers refer to corresponding parts in the various views, 1 is the axle end of a wheel spindle to which the brake carrier plate 2 is bolted by means of bolts 3. Plate 2 supports a carrier bracket 4 by means of the holes 5, 6 and 7. The brake drum 8 is adapted to be engaged by braking means comprising a primary brake shoe 9 and a secondary brake shoe 10, each of which is equipped with the usual friction material 11. The members 9 and 10 are pivoted together through the medium of a joint 12. The construction of the members 9 and 10 is clearly shown in the section Fig. 2, which indicates a piece of sheet metal formed to have a web 13 and flanges 14, in effect producing a hollow or channel construction. The web 13 is adapted to receive the friction material 11 in any suitable manner. In order to actuate the braking members 9 and 10, the free end of the member 9 is equipped with a piece of hard material such as a steel casting or forging 15, referred to hereinafter as a cam follower. The nose 16 is positioned with respect to the carrier bracket 4 so as to be engaged by the cam 17 that is carried by a camshaft supported in the carrier bracket 4. The cam follower 15 is so formed that it has portions 18 extending preferably within the flanges 14 of the member 9 and the parts 18 may be fastened to the flanges 14 in any suitable manner as by welding or rivets 19. Preferably the cam follower 15 abuts against the end of the channel member 9. In the construction shown in Fig. 4 a flat piece of steel may be used to assist the cam follower, the flanges of the channel 14 being punched inwardly to grip the follower 15, and the whole may be welded or riveted together.

At the joint 12 the member 9 is provided with a suitable pivot piece 20 which is fitted to the channel member 9 in a manner similar to the cam follower, likewise the member 10 is provided with a suitable piece 21 to complete the joint 12. The member 21 is also fastened to the member 10 in the same way that 20 is fastened to the primary part 9 of the brake shoe. The member 21 is provided with an ear 22 to which a spring 23 is attached at one end, the other end of the spring being attached to the rim 24 of the carrier plate 2. The spring 23 helps to withdraw the brake shoe from the drum after the cam has been released. The secondary brake shoe member 10 is pivoted at 25 to the carrier bracket 4 through the medium of a piece 26 that is welded or riveted to the channel member 10 in the same way that member 22 is attached to its opposite end. The part 26 is provided with an ear 27 and the cam follower 15 is provided with a corresponding ear 28. These ears are provided with apertures which act as attachment points for a spring 29 acting to withdraw the brake shoes from the drum after the cam 17 has been released.

The type of brake shoes illustrated are known to the trade as the servo self-wrapping type, the direction of rotation of the wheel being indicated by the arrow Fig. 1, but since my invention merely has to do with the particular construction of the shoes per se, no further discussion of the operation of the brake members will be made, except to point out that the joint 12 may take other forms, as illustrated in Figs. 5, 6 and 7. In Fig. 5 the joint 12 is of the hinged type in which a strap member 30 is fastened to the web 13 in any suitable manner as by rivets 31, the other part of the joint being fastened to the member 10 in a similar way. In Fig. 6 the joint 12 is completed through a strap member 32 passing through the flange 14 on the member 9 and a strap 33 is fastened to the flange 14 on the member 10, both side flanges being included as a part of the joint. In Fig. 7 a pin 34 passes through both of the flanges 14 on both sides of members 9 and 10, stop pins 35 being used to hold the pin 34 in position.

From what has been said it will be appreciated that my invention is susceptible of numerous changes and I, therefore, do not wish to be limited except as limited by the scope of the appended claims.

Having thus described my invention, what I claim is:

1. A movable braking member for vehicle wheels comprising a channel shaped formed metal member having a cam follower fastened at one end and a mounting piece at the other end.

2. A movable braking member for vehicle wheels comprising a channel shaped formed steel member having a cam engaging piece fastened to one end and having means at the other end for pivotally mounting said member.

3. A movable braking member for vehicle wheels comprising a channel shaped formed metal member having an auxiliary metal piece attached to at least one end thereof, said auxiliary piece having an ear acting as a restoring spring attachment means.

4. A movable braking member for vehicle wheels comprising a hollow formed metal member having an auxiliary piece attached to at least one end thereof, said auxiliary piece having an ear acting as a point of attachment for a restoring spring.

5. A brake shoe having spaced parallel flanges at its end, and a separate part extending between the flanges and having oppositely-extending thrust shoulders engaging the ends of the flanges.

6. A movable braking member for vehicle wheels comprising a hollow formed steel member adapted to have friction material applied thereto and having one end equipped with pivotal means and a cam engaging piece having a hardened surface attached to the other end.

7. A movable braking member for vehicle wheels comprising a hollow formed metal member adapted to have friction material applied thereto and having an auxiliary cam engaging piece fastened to one end and an auxiliary piece forming an articulate joint attached to the other end as described.

8. A movable braking member for vehicle wheels comprising primary and secondary members jointed together, said members being pressed from sheet metal and having a flat surface for the reception of friction material, one end of one member having an auxiliary cam engaging piece fastened thereto and one end of the other member having an auxiliary mounting piece fastened thereto, both said pieces having an ear for engagement with opposite ends of the same spring as described.

9. A channel shaped brake shoe having spaced side flanges, with a cam-engaging member secured between and reinforcing said flanges at one end of the shoe and having thrust shoulders engaging the ends of the side flanges.

10. A channel shaped brake shoe of pressed metal having parallel spaced side flanges throughout the length of the shoe, with a cam-engaging member secured between and reinforcing said flanges at one end of the shoe.

11. A pressed metal shoe having a recess at one end and a thrust member extending into the recess and having thrust shoulders engaging the end of the shoe.

12. A channel shaped formed metal friction device for a brake having a separate auxiliary piece secured at each end and a retracting spring connected at its ends to said auxiliary pieces.

13. A channel shaped formed metal friction device for a brake having a separate auxiliary piece secured at each end between the side channel flanges and a retracting spring connected at its ends to said auxiliary pieces.

14. A channel shaped formed metal friction device for a brake having parallel side flanges and having a separate thrust member at its end arranged between said side flanges and having a retracting spring secured to said thrust member.

15. A channel shaped formed metal friction device for a brake having parallel side flanges and having a separate thrust member at its end secured to both of said side flanges.

In testimony whereof, I affix my signature.

HENRI PERROT.